United States Patent
Shin

(10) Patent No.: US 7,370,851 B2
(45) Date of Patent: May 13, 2008

(54) DAMPING SYSTEM OF A GLOVE BOX

(75) Inventor: Kwang-Seob Shin, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 0 days.

(21) Appl. No.: 11/024,414

(22) Filed: Dec. 30, 2004

(65) Prior Publication Data

US 2005/0275146 A1 Dec. 15, 2005

(30) Foreign Application Priority Data

Jun. 9, 2004 (KR) ...................... 10-2004-0042082

(51) Int. Cl.
*F16F 1/00* (2006.01)
(52) U.S. Cl. ......................... 267/69; 267/226; 267/137
(58) Field of Classification Search ................ 267/226, 267/69, 70, 71, 73, 137
See application file for complete search history.

(56) References Cited

U.S. PATENT DOCUMENTS 3,868,732 A * 3/1975 Engelhart ...................... 4/496
4,043,239 A * 8/1977 DeFusco ...................... 411/337
4,854,541 A * 8/1989 McConnell ................. 248/565
5,855,463 A * 1/1999 Newby ........................ 411/244
6,269,919 B1 * 8/2001 Bivens et al. ................ 188/288
6,669,178 B2 * 12/2003 Ookawara ..................... 267/71
6,789,993 B2 * 9/2004 Ozawa et al. ................ 411/546
6,854,781 B2 * 2/2005 Roach ......................... 296/57.1
2004/0189035 A1 * 9/2004 Kurachi et al. .......... 296/37.12

FOREIGN PATENT DOCUMENTS

KR 1998-025961 8/1998
KR 1998025961 * 8/1998

* cited by examiner

*Primary Examiner*—Melanie Torres
(74) *Attorney, Agent, or Firm*—Greenblum & Bernstein, P.L.C.

(57) ABSTRACT

A damping system of a glove box using a damper and a wire. The damper is attached to the glove box. An end of the wire is fixed to a fastener on a lower panel. Thereby, when a field problem occurs, the damper is mounted and demounted with ease.

3 Claims, 3 Drawing Sheets

FIG. 3
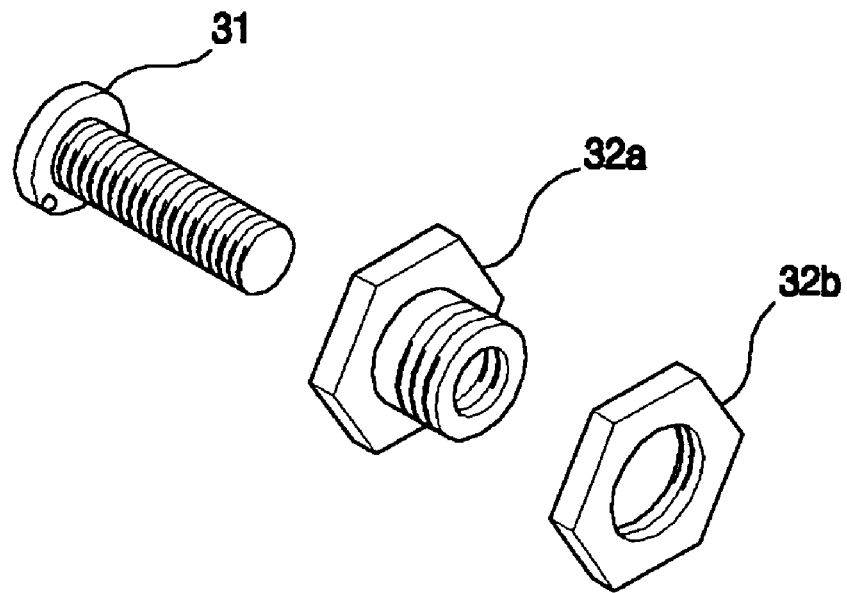
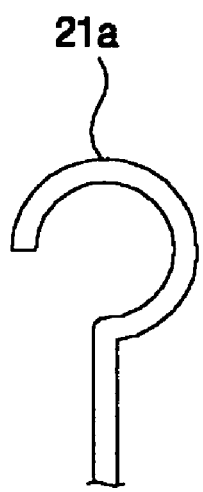
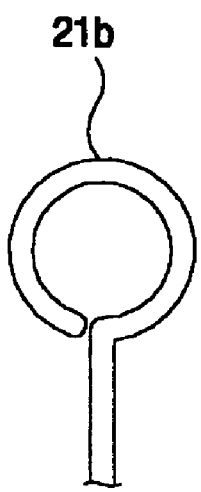
FIG. 4A
FIG. 4B

DAMPING SYSTEM OF A GLOVE BOX

RELATED APPLICATIONS

The present disclosure relates to subject matter contained in priority Korean Application No. 10-2004-0042082, filed on Jun. 09, 2004, which is herein expressly incorporated by reference in its entirety.

BACKGROUND OF THE INVENTION

1. Field of the Invention

The present invention relates to a damping system for adjusting an opening/closing speed of a glove box, and more particularly to a damping system of a glove box, in which a damper is located on a side of the glove box, so that the damper is exposed outward when the glove box is opened, and that a fastening bolt of a wire fixture is easily released, thereby facilitating mounting/demounting operation for repair.

2. Description of the Related Art

In general, automobiles are equipped with various handy devices for accommodating a driver and passengers in an indoor space thereof. Among the handy devices, a glove box is installed to a crash pad in front of a passenger seat. The glove box is opened/closed by rotating about a hinge disposed on a lower end thereof. Here, a damper is used to smooth this opening/closing operation.

Conventionally, the damper has been generally used in a manner that the damper is installed inside the crash pad and that an end of a wire is attached to the opened/closed glove box. As the damper used for the glove box, an air damper composed of a cylinder, a piston, a resilient spring etc. is employed. The air damper is generally operated via the wire. The air damper has been already known in the art (Korean Utility Model Publication No. 1998-025961), and thus its detailed description about a configuration and an operational principle will be omitted.

The foregoing configuration where the damper is installed inside the crash pad makes it difficult to mount/demount a main body of the damper when a field problem takes place. In addition, there is much trouble with an operation of a worker who provides after service.

SUMMARY OF THE INVENTION

Therefore, the present invention is to solve the foregoing problems and/or disadvantages and to provide at least the advantages described hereinafter. Accordingly, the present invention is to allow a damper to be easily mounted/demounted when a field problem occurs, thereby enabling a worker to facilitate working.

In order to accomplish this objective, according to an aspect of the present invention, there is provided a damping system of a glove box. The damping system attaches a damper, which is provided with a piston therein, to the glove box, and fixes an end of a wire, which is connected to the piston, to a fastener of a lower panel. The fastener includes a nut fastening the lower panel, and a fastening bolt screwed with the nut. More preferably, the nut includes an upper nut located on an upper portion of the lower panel and a lower nut located on a lower portion of the lower panel which are screwed together, wherein a direction threaded on an inner circumferential surface of the upper nut and an outer circumferential surface of the lower nut is opposite to that threaded on an inner circumferential surface of the lower nut and an outer circumferential surface of the fastening bolt.

BRIEF DESCRIPTION OF THE DRAWINGS

The above aspects and features of the present invention will be more apparent by describing certain embodiments of the present invention with reference to the accompanying drawings, in which:

FIG. 3 is an exploded perspective view of a nut; and

FIGS. 4A and 4B show ends of a wire taking a ring shape.

DETAILED DESCRIPTION OF THE PREFERRED EMBODIMENTS

Figure 1:
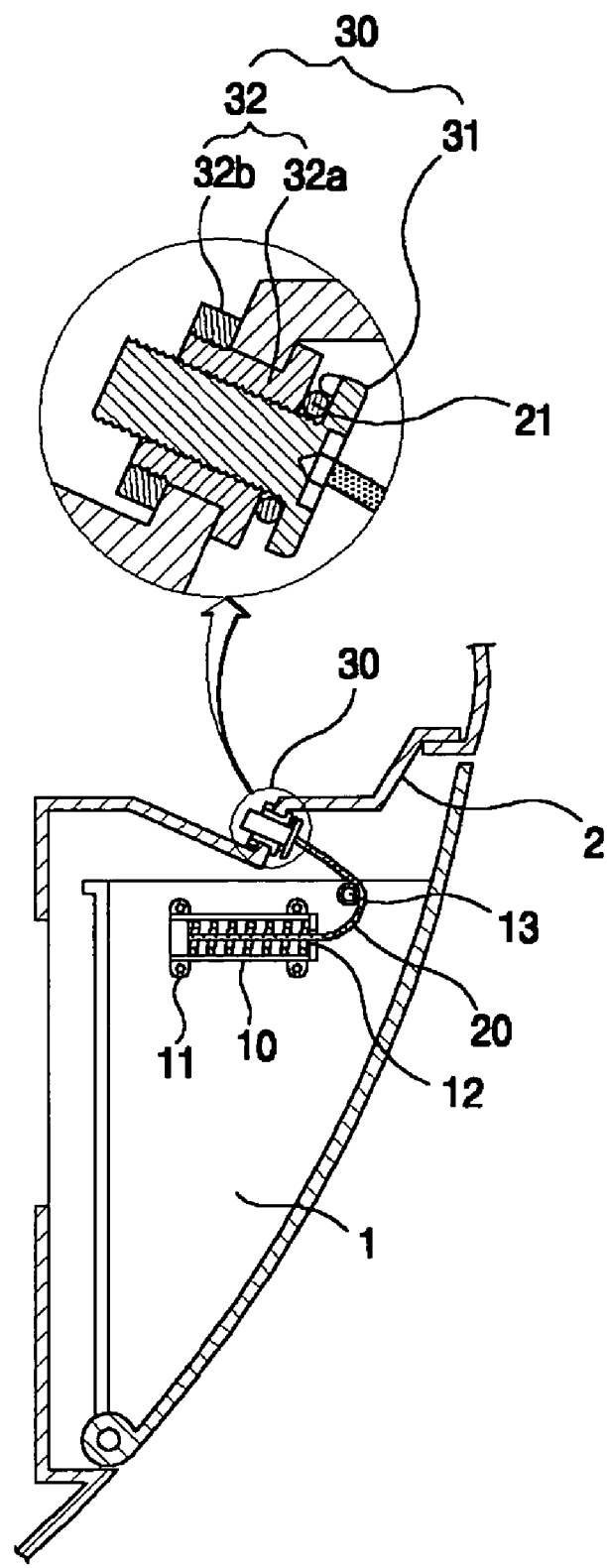
FIG. 1 shows a glove box which is closed and to which a damping system according to the present invention is employed.

Hereinafter, exemplary embodiments of the invention will be described with reference to the accompanying drawings.

A damping system according to the present invention includes a damper 10 and a wire 20. The damper 10 is composed of a piston, a spring, and a cylinder in which the piston is movable. The wire 20 has one end connected with the piston, and the other end fixed to a fastener 30 of a lower panel 2. To this end, the wire 20 is formed in a shape of a ring 21 so that it is readily fixed to the fastener 30. A fixture 11 is formed on an outer circumferential surface of the damper.

The damper is fixed on a side 1 of a glove box by fastening the fixture 11 with a screw and so on. As in Fig. 2, the damper is preferably fixed in a manner that, in a state where the glove box is closed, a wire hole 12 provided on one end of the damper is located toward a passenger nearer than the fastener 30.

A pulley 13 may be attached to the side of the glove box 1 so that the wire can be smoothly shifted.

One end 21 of the wire 20 taking a ring shape is attached to the lower panel 2. The ring shaped end 21 of the wire 20 is open as shown at 21a in FIG. 4A, or closed as shown at 21b in FIG. 4B. As in FIG. 2, the ring shaped end 21 of the wire 20 is hooked on a fastening bolt 31. In this state, the fastening bolt 31 is coupled to a nut 32, thereby fixing the wire 21. The fastening bolt 31 preferably has a clockwise male thread which is generally employed to most of bolts. The nut 32 has a configuration combined by a lower nut 32a of a clockwise female thread and a counterclockwise male thread which is located on an lower portion of the lower panel and by an upper nut 32b of a counterclockwise female thread which is located on a upper portion of the lower panel. The lower nut 32a takes a hollow shape, and has the clockwise female thread on an inner circumferential surface thereof so as to be screwed with the fastening bolt 31, and the counterclockwise male thread on an outer circumferential surface thereof so as to be screwed with the upper nut 32b. This configuration of the fastening bolt 31 and the nut 32 serves to firmly fix the lower panel 2. Accordingly, a direction in which the lower and upper nuts 32a and 32b of the nut 32 are constricted is opposed to a direction in which the fastening bolt 31 and the lower nut 32a. This is to prevent the lower nut 32a from being released from the upper nut 32b when the fastening bolt 31 is released. Of course, it does not matter that the fastening bolt and nut may have threads opposite to the foregoing.

Figure 2:
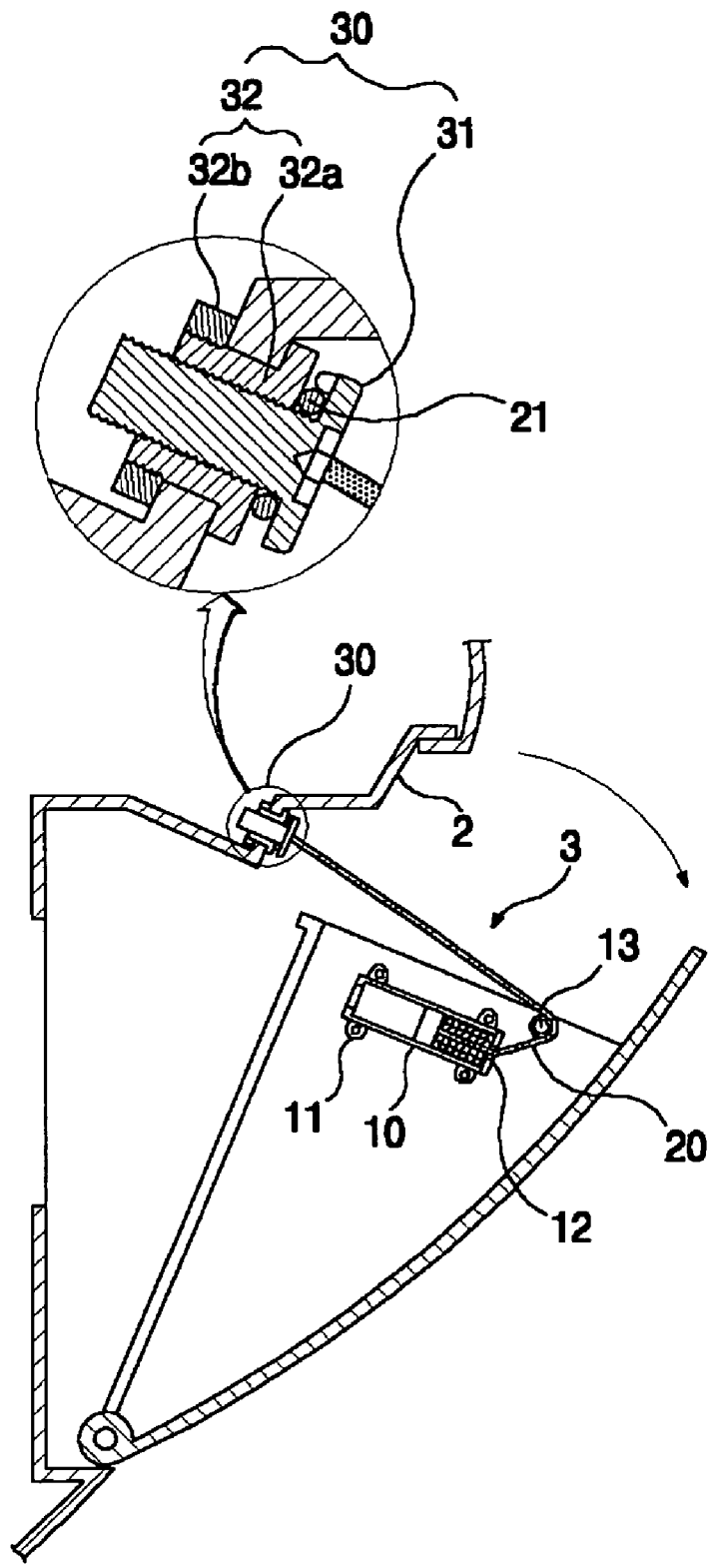
FIG. 2 shows a glove box which is opened and to which a damping system according to the present invention is employed.

The lower panel 2 at a portion where the wire 20 is fixed is preferably directed toward the opening 3 when the glove box is opened as in FIG. 2. This is to readily release the fastening bolt 31 using a box spanner etc. while the glove box is opened. This structure allows the tool such as the spanner to approach the fastener 30 with ease.

In the case of the foregoing structure, once a worker releases only two kinds of components, i.e., the screws fastened to the fixture 11 on the side of the glove box and the fastening bolt 31 on the lower panel configuration while the glove box 1 is opened, the damper 10 is easily separated from and attached to the glove box 1 again.

The present invention has the foregoing effects, which are summarized as follows.

First, it is possible to easily mount/demount the damper to/from the glove box, so that it is easy to perform repair operation when a field problem occurs.

Second, the fastener of the glove box is configured so that a threaded direction of the lower nut and the upper nut is opposite to that of the fastening bolt and the lower nut. Therefore, it is possible to firmly fix the nut on the lower panel when the fastening bolt is released.

Third, the pulley having a groove in which the wire can be guided is attached to the glove box, so that it is possible to more smooth movement of the wire.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A damping system of a glove box, comprising:

a damper provided with a piston therein;

a wire connected to the piston, the wire having one end configured to be ring-shaped; and a pulley is configured to be attached to the side of the glove box to guide the wire for movement, wherein the ring-shaped end of the wire is configured to be fixed to a fastener of a lower panel, the damper is configured to place a wire hole provided at one end of the damper nearer toward a passenger than the fastener when the glove box is closed, and the lower panel, at a portion where the wire is fixed, is configured to face and be accessible through an opening of the glove box when the glove box is opened, wherein the fastener includes:

a nut fastenable to the lower panel; and a fastening bolt threadly connectable with the nut, wherein the nut includes an upper nut locatable on an upper portion of the lower panel and a lower nut locatable on a lower portion of the lower panel which are screwed together, wherein a direction of threading on an inner circumferential surface of the upper nut and an outer circumferential surface of the lower nut is opposite to that threaded on an inner circumferential surface of the lower nut and an outer circumferential surface of the fastening bolt, wherein the fastening bolt has a head facing toward and accessible through the opening of the glove box when the glove box is opened, and wherein the pulley has a groove in which the wire is guided, and is provided at a position spaced from the damper and nearer toward the passenger than the wire hole when the glove box is closed.

2. The damping system as claimed in claim 1, wherein the ring-shaped end of the wire is closed.

3. The damping system as claimed in claim 1, wherein the ring-shaped end of the wire is open.

* * * * *